US009363133B2

(12) United States Patent
Yoakum et al.

(10) Patent No.: US 9,363,133 B2
(45) Date of Patent: Jun. 7, 2016

(54) DISTRIBUTED APPLICATION OF ENTERPRISE POLICIES TO WEB REAL-TIME COMMUNICATIONS (WEBRTC) INTERACTIVE SESSIONS, AND RELATED METHODS, SYSTEMS, AND COMPUTER-READABLE MEDIA

(71) Applicant: Avaya Inc., Basking Ridge, NJ (US)

(72) Inventors: John H. Yoakum, Cary, NC (US); Alan B. Johnston, St. Louis, MO (US)

(73) Assignee: Avaya Inc., Basking Ridge, NJ (US)

(\*) Notice: Subject to any disclaimer, the term of this patent is extended or adjusted under 35 U.S.C. 154(b) by 471 days.

(21) Appl. No.: 13/863,662

(22) Filed: Apr. 16, 2013

(65) Prior Publication Data

US 2014/0095724 A1 Apr. 3, 2014

Related U.S. Application Data

(60) Provisional application No. 61/706,951, filed on Sep. 28, 2012, provisional application No. 61/781,122, filed on Mar. 14, 2013.

(51) Int. Cl.
*H04L 29/08* (2006.01)
*H04L 29/06* (2006.01)

(52) U.S. Cl.
CPC ...... *H04L 29/08054* (2013.01); *H04L 63/0218* (2013.01); *H04L 63/20* (2013.01); *H04L 65/1003* (2013.01); *H04L 67/28* (2013.01)

(58) Field of Classification Search
CPC ............ H04L 29/08054; H04L 63/0218; H04L 63/20; H04L 67/28; H04L 65/1003
USPC ........................................ 709/228
See application file for complete search history.

(56) References Cited

U.S. PATENT DOCUMENTS 6,714,967 B1 3/2004 Horvitz
7,107,316 B2 9/2006 Brown et al.
(Continued)

FOREIGN PATENT DOCUMENTS

CN 101609540 A \* 12/2009
EP 1615386 A1 1/2006
(Continued)

OTHER PUBLICATIONS https://webrtc.org/.\*
(Continued)

*Primary Examiner* — Kostas Katsikis
(74) *Attorney, Agent, or Firm* — Withrow & Terranova, PLLC

(57) ABSTRACT

Distributed application of enterprise policies to WebRTC interactive sessions, and related methods, systems, and computer-readable media are disclosed. In this regard, in one embodiment, a method for applying an enterprise policy to a WebRTC interactive session comprises receiving, by a distributed policy enforcement agent of a recipient device, a WebRTC session description object directed to the recipient device originating from a sender device via a secure network connection. The method further comprises determining, by the distributed policy enforcement agent, one or more enterprise policies based on the WebRTC session description object. The method additionally comprises applying the one or more enterprise policies to the WebRTC session description object. In this manner, an enterprise may permit establishment of a WebRTC interactive session that crosses an enterprise network boundary, while at the same time ensuring that the WebRTC interactive session complies with the one or more enterprise policies.

28 Claims, 7 Drawing Sheets

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 * | 12/2013 | Ryner ............... G06F 21/45 709/228 |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2002/0159464 A1 | 10/2002 | Lewis |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0133767 A1 | 6/2008 | Birrer et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2008/0313260 A1 * | 12/2008 | Sweet ............... G06F 17/3089 709/201 |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2011/0289037 A1 | 11/2011 | Tullio et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2012/0268553 A1 | 10/2012 | Talukder |
| 2012/0313785 A1 | 12/2012 | Hanson et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0136253 A1 * | 5/2013 | Liberman Ben-Ami ........... H04M 3/5191 379/265.09 |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1 * | 5/2014 | Lum ............... H04M 3/5133 379/265.09 |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 * | 8/2014 | Santhanam ....... H04W 28/0268 370/328 |
| 2014/0222894 A1 | 8/2014 | Gangadharan et al. |
| 2014/0222930 A1 | 8/2014 | Gangadharan et al. |
| 2014/0222957 A1 * | 8/2014 | Gangadharan ........ H04L 67/141 709/217 |
| 2014/0223452 A1 * | 8/2014 | Santhanam ........... H04L 67/141 719/328 |
| 2014/0237057 A1 | 8/2014 | Khodorenko |
| 2014/0241215 A1 * | 8/2014 | Massover ........... H04L 12/1818 370/260 |
| 2014/0244235 A1 | 8/2014 | Michaelis |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0280995 A1 * | 9/2014 | Ezell ............... H04L 65/1016 709/229 |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1 * | 10/2014 | Gao ............... G06F 17/00 709/204 |
| 2014/0325078 A1 | 10/2014 | Shan et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002614 A1 * | 1/2015 | Zino ............... H04N 7/147 348/14.08 |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1 | 2/2015 | Pastro |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| EP | 2529316 A2 | 12/2012 |
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |

(56) References Cited

FOREIGN PATENT DOCUMENTS

| WO | 2014123738 A1 | 8/2014 |
|---|---|---|
| WO | 2014190094 A1 | 11/2014 |
| WO | 2015032277 A1 | 3/2015 |

OTHER PUBLICATIONS

L. L. Fernández, M. P. Diaz, R. B. Mejías, F. J. López and J. A. Santos, "Kurento: a media server technology for convergent WWW/mobile real-time multimedia communications supporting WebRTC," World of Wireless, Mobile and Multimedia Networks (WoWMoM), 2013 IEEE 14th International Symposium and Workshops on a, Madrid, 2013, pp. 1-6. doi: 10.1109/WoWM.*
Johnston, Alan B., and Daniel C. Burnett. WebRTC: APIs and RTCWEB protocols of the HTML5 real-time web. Digital Codex LLC, 2012.*
Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Non-Final Office Action for U.S. Appl. No. 13/955,023, mailed Feb. 2, 2015, 12 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.

(56) References Cited

OTHER PUBLICATIONS

Final Office Action and Examiner Initiated Interview Summary for U.S. Appl. No. 14/050,891, mailed Jun. 29, 2015, 11 pages.
Final Office Action for U.S. Appl. No. 13/955,023, mailed Jul. 20, 2015, 17 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Extended European Search Report for European Patent Application 15161452.6, mailed Jun. 23, 2015, 5 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 mailed Mar. 14, 2014, 3 pages.
Search Report for British patent application GB1317122.8 mailed Mar. 11, 2014, 3 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 13/955,023, mailed Dec. 9, 2015, 13 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Advisory Action for U.S. Appl. No. 13/931,970, mailed Nov. 5, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Search Report for British Patent Application No. GB1423089.0, mailed Jul. 6, 2015, 4 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.
Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 14/174,371, mailed Feb. 18, 2016, 18 pages.
Non-Final Office Action for U.S. Appl. No. 13/931,970, mailed Feb. 23, 2016, 11 pages.
Final Office Action for U.S. Appl. No. 13/912,520, mailed Mar. 2, 2016, 11 pages.
Final Office Action for U.S. Appl. No. 13/803,292, mailed Mar. 9, 2016, 14 pages.
Final Office Action for U.S. Appl. No. 13/955,711, mailed Mar. 21, 2016, 12 pages.
Decision to Grant a Patent for Japanese Patent Application No. 2013-201221, mailed Mar. 29, 2016, 5 pages.
Decision of Rejection for Japanese Patent Application No. 2013-201228, dispatched Feb. 25, 2016, 6 pages.

* cited by examiner

DISTRIBUTED APPLICATION OF ENTERPRISE POLICIES TO WEB REAL-TIME COMMUNICATIONS (WEBRTC) INTERACTIVE SESSIONS, AND RELATED METHODS, SYSTEMS, AND COMPUTER-READABLE MEDIA

PRIORITY APPLICATIONS

The present application claims priority to U.S. Provisional Patent Application Ser. No. 61/706,951 filed Sep. 28, 2012, and entitled "ENTERPRISE COMMUNICATIONS AND COLLABORATION SYSTEMS BASED ON REAL-TIME COMMUNICATIONS AND/OR MARKUP PROTOCOLS, AND RELATED METHODS, APPARATUSES, AND COMPUTER-READABLE MEDIA," and to U.S. Provisional Patent Application Ser. No. 61/781,122 filed on Mar. 14, 2013, and entitled "DISTRIBUTED APPLICATION OF ENTERPRISE POLICIES TO WEB REAL-TIME COMMUNICATIONS (WEBRTC) INTERACTIVE SESSIONS, AND RELATED METHODS, SYSTEMS, AND COMPUTER-READABLE MEDIA," which are hereby incorporated herein by reference in their entireties.

BACKGROUND

1. Field of the Disclosure

The technology of the disclosure relates generally to Web Real-Time Communications (WebRTC) interactive sessions.

2. Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett (2012 Digital Codex LLC), which is incorporated in its entirety herein by reference.

WebRTC provides built-in capabilities for establishing real-time video, audio, and/or data streams in both point-to-point interactive sessions, as well as multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive session (e.g., a real-time video, audio, and/or data exchange), two web clients may retrieve WebRTC-enabled web applications, such as HTML5/JavaScript web applications, from a web application server. Through the web applications, the two web clients then engage in a media negotiation to communicate and reach an agreement on parameters that define characteristics of the interactive session. This media negotiation is known as a WebRTC "offer/answer" exchange. A WebRTC "offer/answer" exchange typically occurs via a secure network connection such as a Hypertext Transfer Protocol Secure (HTTPS) connection or a Secure WebSockets connection. In an offer/answer exchange, a first web client on a sender device sends an "offer" to a second web client on a recipient device. The offer includes a WebRTC session description object that specifies media types and capabilities that the first web client supports and prefers for use in the WebRTC interactive session. The second web client then responds with a WebRTC session description object "answer" that indicates which of the offered media types and capabilities are supported and acceptable for the WebRTC interactive session. Once the WebRTC offer/answer exchange is complete, the web clients may then establish a direct "peer connection" with one another, and may begin an exchange of media or data packets transporting the real-time communications. The peer connection between the web clients typically employs the Secure Real-time Transport Protocol (SRTP) to transport real-time media flows, and may utilize various other protocols for real-time data interchange.

The secure nature of a WebRTC offer/answer exchange and peer connection poses challenges for real-time communications across enterprise network boundaries. To determine whether to allow traffic to cross network edges, enterprises often rely on network security elements (e.g., firewalls and session border controllers (SBCs)). These network security elements may examine protocols at various levels in a network stack, including the actual content of the network traffic. Such in-depth analysis of network traffic may enable an enterprise to apply enterprise policies to achieve fine-grained control over the network traffic. However, because the WebRTC offer/answer exchange and peer connection may take place over secure network connections or otherwise be encrypted, the WebRTC session description objects and the WebRTC interactive flow exchanged between the web clients may be opaque to the enterprise. Thus, the enterprise may lack the ability to apply enterprise policies to a WebRTC interactive session using conventional network security elements. The secure nature of WebRTC may also present risks to the enterprise in the form of a new path for attack by virus vectors and/or malware.

SUMMARY OF THE DETAILED DESCRIPTION

Embodiments disclosed in the detailed description provide distributed application of enterprise policies to Web Real-Time Communications (WebRTC) interactive sessions. Related methods, systems, and computer-readable media are also disclosed. In this regard, in one embodiment, a method for applying an enterprise policy to a WebRTC interactive session is provided. The method comprises receiving, by a distributed policy enforcement agent of a recipient device, a WebRTC session description object directed to the recipient device originating from a sender device. The method further comprises determining, by the distributed policy enforcement agent, one or more enterprise policies based on the WebRTC session description object. The method also comprises applying the one or more enterprise policies to the WebRTC session description object. Use of the distributed policy enforcement agent of the recipient device allows in-depth analysis of the contents of the WebRTC session description object, including the packets transporting the WebRTC session description object, after it is received at the recipient device and before a WebRTC interactive session is established. In this manner, an enterprise may permit establishment of a WebRTC interactive session that crosses an enterprise network boundary, while at the same time ensuring that the WebRTC interactive session complies with the one or more enterprise policies.

In another embodiment, a system for applying an enterprise policy to a WebRTC interactive session is provided. The system comprises at least one communications interface, and a recipient device associated with the at least one communications interface and comprising a distributed policy enforcement agent. The distributed policy enforcement agent is configured to receive a WebRTC session description object directed to the recipient device originating from a sender device via a secure network connection. The distributed policy enforcement agent is further configured to determine one or more enterprise policies based on the WebRTC session description object. The distributed policy enforcement agent is also configured to apply the one or more enterprise policies to the WebRTC session description object.

In another embodiment, a non-transitory computer-readable medium is provided. The non-transitory computer-readable medium has stored thereon computer-executable instructions to cause a processor to implement a method comprising receiving, by a distributed policy enforcement agent of a recipient device, a WebRTC session description object directed to the recipient device originating from a sender device. The method implemented by the computer-executable instructions further comprises determining, by the distributed policy enforcement agent, one or more enterprise policies based on the WebRTC session description object. The method implemented by the computer-executable instructions also comprises applying the one or more enterprise policies to the WebRTC session description object.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
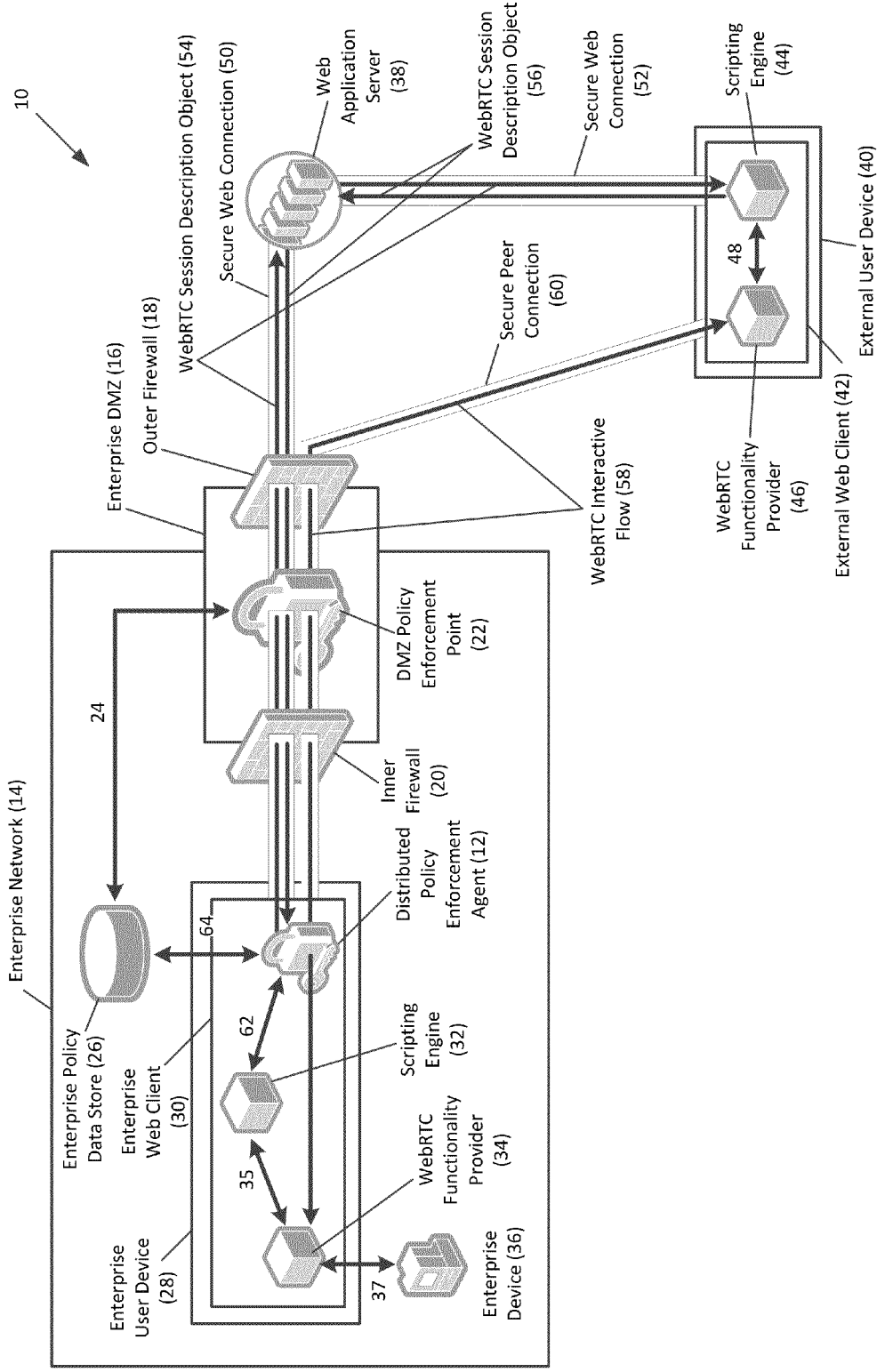
FIG. 1 is a conceptual diagram showing an exemplary "triangle" topology of a Web Real-Time Communications (WebRTC) interactive session between an enterprise web client on a recipient device including a distributed policy enforcement agent and an external web client on a sender device.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide distributed application of enterprise policies to Web Real-Time Communications (WebRTC) interactive sessions. Related methods, systems, and computer-readable media are also disclosed. In this regard, in one embodiment, a method for applying an enterprise policy to a WebRTC interactive session is provided. The method comprises receiving, by a distributed policy enforcement agent of a recipient device, a WebRTC session description object directed to the recipient device originating from a sender device. The method further comprises determining, by the distributed policy enforcement agent, one or more enterprise policies based on the WebRTC session description object. The method also comprises applying the one or more enterprise policies to the WebRTC session description object. Use of the distributed policy enforcement agent of the recipient device allows in-depth analysis of the contents of the WebRTC session description object, including the packets transporting the WebRTC session description object, after it is received at the recipient device and before a WebRTC interactive session is established. In this manner, an enterprise may permit establishment of a WebRTC interactive session that crosses an enterprise network boundary, while at the same time ensuring that the WebRTC interactive session complies with the one or more enterprise policies.

In this regard, FIG. 1 shows an exemplary interactive communications system 10 providing distributed application of enterprise policies as disclosed herein. In particular, the exemplary system 10 includes a distributed policy enforcement agent 12 that provides a point at which enterprise policies may be applied to WebRTC interactive sessions, which otherwise may be inaccessible to enterprise network security elements. As used herein, the term "distributed" in the context of the distributed policy enforcement agent 12 refers to the application of enterprise policies taking place at one or more WebRTC interactive session endpoints, rather than at a centralized network security element.

As seen in FIG. 1, the exemplary system 10 includes an enterprise network 14 providing networked computing and communications resources to users within an enterprise. As used herein, an "enterprise" refers to any organization for the purpose of a business venture or other organized activity, private or public. The enterprise network 14 includes an enterprise "demilitarized zone" (DMZ) 16 to secure the enterprise network 14 while permitting both enterprise users and external users access to enterprise resources (not shown) within the enterprise DMZ 16. The enterprise DMZ 16 may provide an outer firewall 18 that prevents unauthorized access to the enterprise network 14 by users outside the enterprise network 14. The enterprise DMZ 16 may also provide an inner firewall 20 that permits only external traffic passing through the enterprise DMZ 16 to reach users within the enterprise network 14.

The enterprise DMZ 16 of FIG. 1 may further include a DMZ policy enforcement point 22. The DMZ policy enforcement point 22 filters or alters network traffic passing through the enterprise DMZ 16 in accordance with enterprise policies. As indicated by bidirectional arrow 24, the DMZ policy enforcement point 22 may be communicatively coupled to an enterprise policy data store 26 that provides a central point for storage, maintenance, and dissemination of enterprise policies. As is commonly understood, an enterprise policy is a formulation of rules that defines levels of permission and access rights in order to secure data, control user access, and regulate traffic within the enterprise network 14. Virtually all aspects of activity within the enterprise network 14 may be subject to enterprise policies. As non-limiting examples, enterprise policies may specify users that have been granted access to the enterprise network 14, external websites that enterprise users may or may not access, or types of allowed or disallowed network traffic. It is to be understood that the enterprise DMZ 16 may include additional elements not illustrated in FIG. 1, or may integrate multiple elements illustrated in FIG. 1 into a single element.

The ability of the DMZ policy enforcement point 22 to apply enterprise policies to network traffic passing through the enterprise DMZ 16 may depend on whether the network traffic is unencrypted, or is transported in an encrypted format. In the former scenario, the DMZ policy enforcement point 22 may analyze various protocols within the network stack and/or the actual content of the network traffic, and apply enterprise policies to the network traffic based on its analysis. However, in the latter scenario, the DMZ policy enforcement point 22 may have access only to limited information about the network traffic, such as a source Internet Protocol (IP) address, a destination IP address, a source port number, a destination port number, and/or a network protocol in use. In such case, the DMZ policy enforcement point 22 may be forced to apply enterprise policies based only on this limited information. Moreover, even where the network traffic is unencrypted, the DMZ policy enforcement point 22 may not be capable of applying enterprise policies at an endpoint within the enterprise network 14 based on data received at the endpoint. Accordingly, as discussed in greater detail below, the distributed policy enforcement agent 12 is provided to enable the enterprise to enforce enterprise policies at an endpoint within the enterprise network 14, based on an in-depth analysis of packets and their contents received at the endpoint.

Before discussing details of the distributed policy enforcement agent 12, the establishment of a WebRTC interactive session in the system 10 of FIG. 1 is first described. As used herein, a WebRTC interactive session refers to operations for carrying out a WebRTC offer/answer exchange, establishing a peer connection, and commencing a WebRTC interactive flow between two or more endpoints. A WebRTC interactive flow may comprise an interactive media flow and/or an interactive data flow between the two or more endpoints. Within the enterprise network 14 of FIG. 1 is an enterprise user device 28 executing an enterprise web client 30. In some embodiments, the enterprise user device 28 may be any computing or communications device having network communications capabilities, such as a smartphone, a tablet computer, a dedicated web appliance, or a desktop computer, as non-limiting examples. The enterprise web client 30 in this example may be a web browser application, a dedicated communications application, or an interface-less application such as a daemon or service application, as non-limiting examples.

In this embodiment, the enterprise web client 30 comprises a scripting engine 32 and a WebRTC functionality provider 34. The scripting engine 32 enables client-side applications written in a scripting language, such as JavaScript, to be executed within the enterprise web client 30. The scripting engine 32 also provides an application programming interface (API) to facilitate communications with other functionality providers within the enterprise web client 30 and/or the enterprise user device 28, and/or with other web clients, user devices, or web servers. The WebRTC functionality provider 34 implements the protocols, codecs, and APIs necessary to enable real-time interactive sessions via WebRTC. The scripting engine 32 and the WebRTC functionality provider 34 are communicatively coupled via a set of defined APIs, as indicated by bidirectional arrow 35.

The enterprise network 14 may also include an enterprise device 36, which is communicatively coupled to the WebRTC functionality provider 34 as indicated by bidirectional arrow 37. As discussed in greater detail below, the enterprise device 36 may be operative to record, log, or redirect a WebRTC interactive flow received from the WebRTC functionality provider 34 according to enterprise policies.

External to the enterprise network 14 is a web application server 38, which serves a WebRTC-enabled web application (not shown) to requesting web clients. In some embodiments, the web application server 38 may be a single server, while in some applications the web application server 38 may comprise multiple servers that are communicatively coupled to each other. It is to be understood that the web application server 38 may reside in the enterprise DMZ 16 of the enterprise network 14, or may reside within an enterprise DMZ of an enterprise network external to the enterprise network 14.

Also external to the enterprise network 14 is an external user device 40 executing an external web client 42. The external user device 40 may be any computing or communications device having network communications capabilities, such as a smartphone, a tablet computer, a dedicated web appliance, or a desktop computer, as non-limiting examples. The external web client 42 may be a web browser application, a dedicated communications application, or an interface-less application such as a daemon or service application, as non-limiting examples. In this embodiment, the external web client 42 comprises a scripting engine 44 and a WebRTC functionality provider 46, the functionality of which corresponds to the functionality of the scripting engine 32 and the WebRTC functionality provider 34 of the enterprise web client 30, respectively. The scripting engine 44 and the WebRTC functionality provider 46 are communicatively coupled via a set of defined APIs, as indicated by bidirectional arrow 48. It is to be further understood that the external web client 42 may reside within an enterprise network external to the enterprise network 14.

FIG. 1 further illustrates the characteristic WebRTC "triangle" topology that results from establishing a WebRTC interactive session between the enterprise web client 30 and the external web client 42. To establish a WebRTC interactive session, the enterprise web client 30 and the external web client 42 both download the same WebRTC web application (not shown) from the web application server 38. In some embodiments, the WebRTC web application comprises an HTML5/JavaScript web application that provides a rich user interface using HTML5, and uses JavaScript to handle user input and to communicate with the web application server 38.

The enterprise web client 30 and the external web client 42 then establish secure web connections 50 and 52, respectively, with the web application server 38, and engage in a WebRTC offer/answer exchange. This is accomplished through an exchange of WebRTC session description objects indicated by arrows 54 and 56. The exchanged WebRTC session description objects 54 and 56 are used to determine the media types and capabilities for the desired WebRTC interactive session. Once the WebRTC offer/answer exchange is complete, a WebRTC interactive flow 58 may be established via a secure peer connection 60 between the enterprise web client 30 and the external web client 42. Accordingly, in FIG. 1 the vertices of the WebRTC "triangle" are the web application server 38, the outer firewall 18 (which serves as the outer edge of the enterprise network 14 through which the enterprise web client 30 communicates), and the external web client 42. The edges of the "triangle" are represented by the secure web connections 50 and 52 and the secure peer connection 60.

It is to be understood that some embodiments may utilize topographies other than the WebRTC "triangle" topography illustrated in FIG. 1. For example, some embodiments may employ a "trapezoid" topography in which two web servers communicate directly with each other via protocols such as Session Initiation Protocol (SIP) or Jingle, as non-limiting examples. It is to be further understood that, instead of the enterprise web client 30 and/or the external web client 42, the enterprise user device 28 and/or the external user device 40 respectively may comprise a SIP client device, a Jingle client device, or a Public Switched Telephone Network (PTSN) gateway device that is communicatively coupled to a telephone.

As seen in FIG. 1, the WebRTC session description object 54 received by the enterprise web client 30 from the external web client 42 during the WebRTC offer/answer exchange as well as the resulting WebRTC interactive flow 58 must pass through the enterprise DMZ 16 via the secure web connection 50 and the secure peer connection 60, respectively. Consequently, the DMZ policy enforcement point 22 is not aware of the actual contents of the WebRTC session description object 54 or the WebRTC interactive flow 58 received by the enterprise web client 30. Thus, the DMZ policy enforcement point 22 cannot apply enterprise policies to the WebRTC interactive session based on the content of the WebRTC session description object 54 or the WebRTC interactive flow 58.

In this regard, the distributed policy enforcement agent 12 of FIG. 1 is provided. In some embodiments, the distributed policy enforcement agent 12 is implemented as an extension or plug-in for the enterprise web client 30 for receiving and processing packets received by the enterprise web client 30. In the case of encrypted network traffic, the distributed policy enforcement agent 12 is able to access the content of the encrypted network traffic after it is decrypted within the enterprise web client 30. The distributed policy enforcement agent 12 may also access data provided by the packets transporting the network traffic, such as a source Internet Protocol (IP) address, a destination IP address, a source port number, a destination port number, and/or a network protocol in use, as non-limiting examples. Accordingly, during establishment of a WebRTC interactive session, the distributed policy enforcement agent 12 receives a WebRTC session description object 54 transported over the secure web connection 50. The distributed policy enforcement agent 12 then determines and applies enterprise policies based on the WebRTC session description object 54, including the content of the WebRTC session description object 54 and/or data provided by the packets transporting the WebRTC session description object 54. In the case of unsecured network traffic, the distributed policy enforcement agent 12 may similarly analyze the WebRTC session description object 54 for the purpose of applying enterprise policies at the enterprise web client 30. As non-limiting examples, the distributed policy enforcement agent 12 may apply enterprise policies via one or more of the following methods: validating the WebRTC session description object format; establishing or declining a WebRTC interactive session; providing options for an alternative WebRTC interactive session to the external user device 40; modifying the contents of a WebRTC session description object; and/or causing a WebRTC interactive flow to be redirected, cloned, logged, or recorded.

In some embodiments, the distributed policy enforcement agent 12 is communicatively coupled to the scripting engine 32, as indicated by bidirectional arrow 62 in FIG. 1. Some embodiments may provide that the distributed policy enforcement agent 12 is further communicatively coupled to the enterprise policy data store 26 via a communications link 64. In this manner, the distributed policy enforcement agent 12 may query the enterprise policy data store 26 for enterprise policies to apply to the secure web connection 50. Some embodiments may provide that data exchanged between the external user device 40 and the enterprise user device 28, as part of establishing the secure peer connection 60 or as part of the WebRTC interactive flow 58, is received and analyzed by the distributed policy enforcement agent 12 before being passed to the WebRTC functionality provider 34. As discussed below, this may permit the distributed policy enforcement agent 12 to apply enterprise policies during the establishment of the secure peer connection 60 and/or during the exchange of the WebRTC interactive flow 58. In embodiments where the WebRTC interactive flow 58 comprises an interactive data interchange, the distributed policy enforcement agent 12 may examine the contents of the WebRTC interactive flow 58 to detect malware, viruses, or unauthorized enterprise intellectual property, as non-limiting examples.

Figure 2:
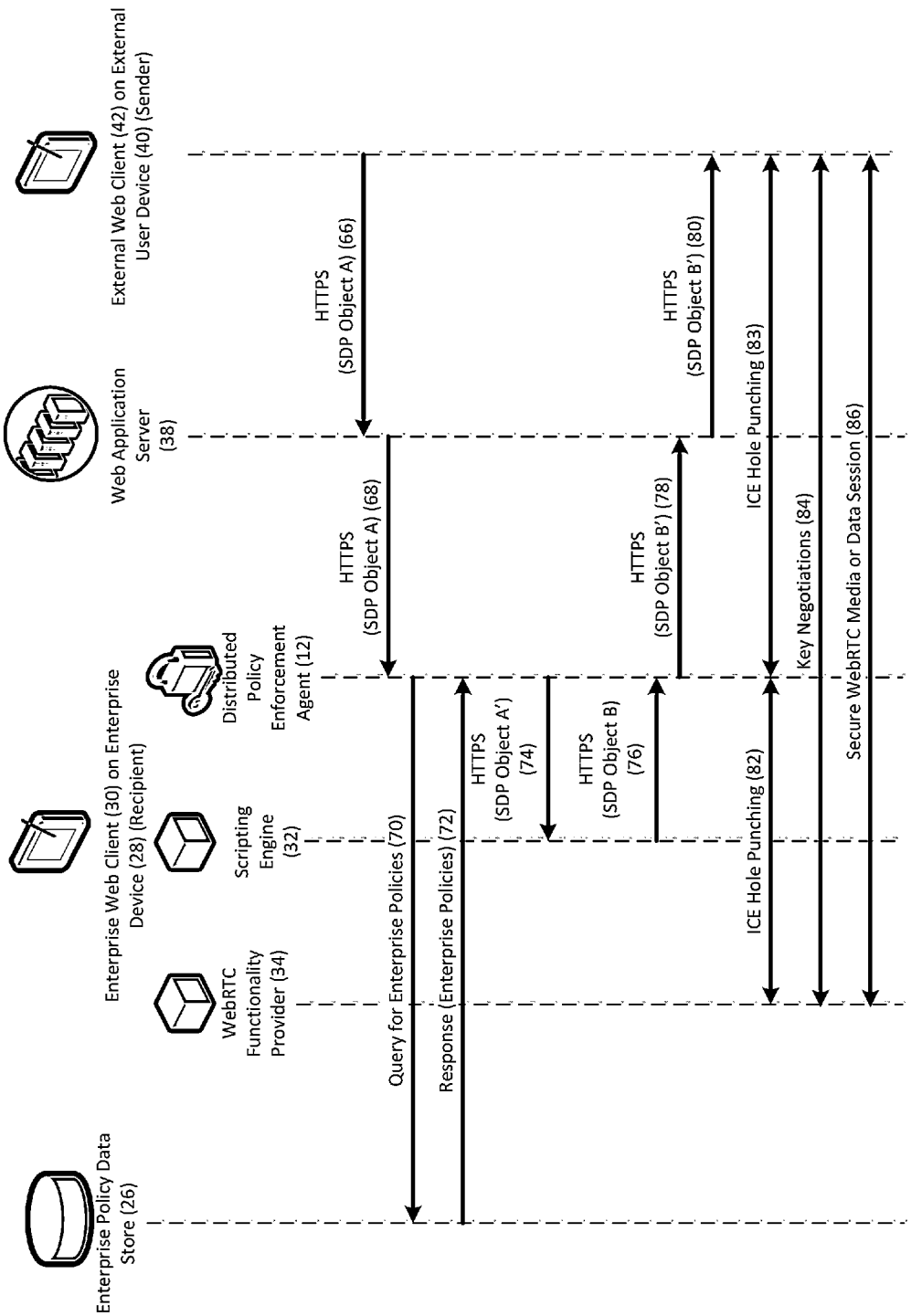
FIG. 2 is a diagram illustrating exemplary communications flows within an exemplary system including a distributed policy enforcement agent of a recipient device.

To illustrate exemplary communications flows during the establishment of a WebRTC interactive session including the distributed policy enforcement agent 12 of FIG. 1, FIG. 2 is provided. In FIG. 2, the enterprise policy data store 26, the enterprise web client 30 on the enterprise user device 28, the web application server 38, and the external web client 42 on the external user device 40 of FIG. 1 are each represented by vertical dotted lines. The WebRTC functionality provider 34, the scripting engine 32, and the distributed policy enforcement agent 12 of the enterprise web client 30 are shown as separate elements to better illustrate communications flows therebetween. It is to be understood that the external web client 42 may comprise a scripting engine 44 and a WebRTC functionality provider 46, which for the sake of clarity are omitted from this example. It is to be further understood that, in this example, the distributed policy enforcement agent 12 on the enterprise user device 28 examines the WebRTC session description object received from the external user device 40. Accordingly, the enterprise user device 28 is considered the "recipient" device, while the external user device 40 is considered the "sender" device. Finally, it is assumed for this example that the enterprise web client 30 and the external web client 42 have each downloaded a WebRTC-enabled web application, such as an HTML5/JavaScript WebRTC application, from the web application server 38.

As seen in FIG. 2, the establishment of a WebRTC interactive session begins with the external web client 42 sending a session description object (SDP) to the web application server 38 in an encrypted format (in this example, via an HTTPS connection). In this example, the WebRTC session description object is referred to as SDP Object A and is indicated by arrow 66. SDP Object A represents the "offer" in a WebRTC offer/answer exchange. SDP Object A specifies the media types and capabilities that the external web client 42 supports and prefers for use in the WebRTC interactive session. The web application server 38 forwards the SDP Object A by a secure web connection to the distributed policy enforcement agent 12 of the enterprise web client 30 of the enterprise user device 28, as indicated by arrow 68.

As noted above, the distributed policy enforcement agent 12 may access the contents of network traffic received over a secure web connection after the network traffic has been decrypted, and may additionally examine data provided by the packets transporting the network traffic. Thus, the distributed policy enforcement agent 12 is able to examine the contents of the SDP Object A as well as data provided by packets transporting the SDP Object A. In some embodiments, the distributed policy enforcement agent 12 at this point may compare the format of the SDP Object A to an expected WebRTC session description object format. If the SDP Object A does not conform to the expected format, the distributed policy enforcement agent 12 may discard SDP Object A, and a WebRTC interactive session will not be established. If the SDP Object A appears valid, then establishment of the WebRTC interactive session may continue.

Based on the contents of the SDP Object A, the distributed policy enforcement agent 12 sends a query for enterprise policies to the enterprise policy data store 26, as indicated by arrow 70. The query may be based on or include data extracted from contents of the SDP Object A and/or other available data related to the SDP Object A, such as characteristics of or data in the packets comprising the SDP Object A. As non-limiting examples, such data may include an identity associated with the external user device 40, an identity of an intermediary that forwarded the SDP Object A to the enterprise user device 28, an exchange of encryption keys, or a type of WebRTC interactive flow. In response to the query, the enterprise policy data store 26 returns the requested enterprise policies to the distributed policy enforcement agent 12, indicated by arrow 72 in FIG. 2. The distributed policy enforcement agent 12 then applies the enterprise policies to the SDP Object A. In some embodiments, applying the enterprise policies to the SDP Object A may comprise the following: further validating the WebRTC session description object format; establishing or declining to establish a WebRTC interactive session; providing options to the external user device 40 for an alternative WebRTC interactive session; and/or modifying the contents of a WebRTC session description object, as non-limiting examples.

Assuming the enterprise policies applied by the distributed policy enforcement agent 12 permit the establishment of the WebRTC interactive session to proceed, the distributed policy enforcement agent 12 next passes the WebRTC session description object to the scripting engine 32 for conventional processing, as indicated by arrow 74. As noted above, the distributed policy enforcement agent 12 may have modified the contents of SDP Object A in applying the enterprise policies. Thus, the WebRTC session description object forwarded to the scripting engine 32 is designated SDP Object A'.

After the scripting engine 32 receives the SDP Object A' from the distributed policy enforcement agent 12, the scripting engine 32 in response sends a WebRTC session description object, referred to as SDP Object B, to the distributed policy enforcement agent 12, as indicated by arrow 76. The SDP Object B in this example represents the "answer" in the WebRTC offer/answer exchange. In some embodiments, the distributed policy enforcement agent 12 may apply enterprise policies by modifying a content of the SDP Object B prior to forwarding it on to the web application server 38. Accordingly, the WebRTC session description object forwarded by the distributed policy enforcement agent 12 is referred to as SDP Object B'. SDP Object B' is sent to the web application server 38 via a secure network connection, as indicated by arrow 78. The web application server 38, in turn, forwards the SDP Object B' to the external user device 40, as shown by arrow 80.

With continuing reference to FIG. 2, the external web client 42 on the external user device 40 and the enterprise web client 30 (in particular, the WebRTC functionality provider 34) then begin "hole punching" to determine the best way to establish direct communications. This is indicated by bidirectional arrows 82 and 83 in FIG. 2. Hole punching is a technique, often using protocols such as Interactive Connectivity Establishment (ICE), in which both web clients establish a connection with an unrestricted third-party server (not shown) that uncovers external and internal address information for use in direct communications. In this example, the distributed policy enforcement agent 12 may receive, analyze, and modify data exchanged as part of hole punching. For example, the distributed policy enforcement agent 12 may add or remove a Session Traversal Utilities for NAT (STUN) server and/or a Traversal Using Relays around NAT (TURN) server used by the enterprise user device 28 for hole punching. In this manner, the distributed policy enforcement agent 12 may apply enterprise policies to the WebRTC interactive session even after the WebRTC offer/answer exchange has concluded.

Once the hole punching indicated by arrows 82 and 83 is successful, the external web client 42 and the WebRTC functionality provider 34 of the enterprise web client 30 begin key negotiations to establish a secure peer connection (bidirectional arrow 84). Upon establishing a secure peer connection, the external web client 42 and the WebRTC functionality provider 34 of the enterprise web client 30 begin exchanging secure WebRTC media or data flows, as shown by bidirectional arrow 86.

Figure 3:
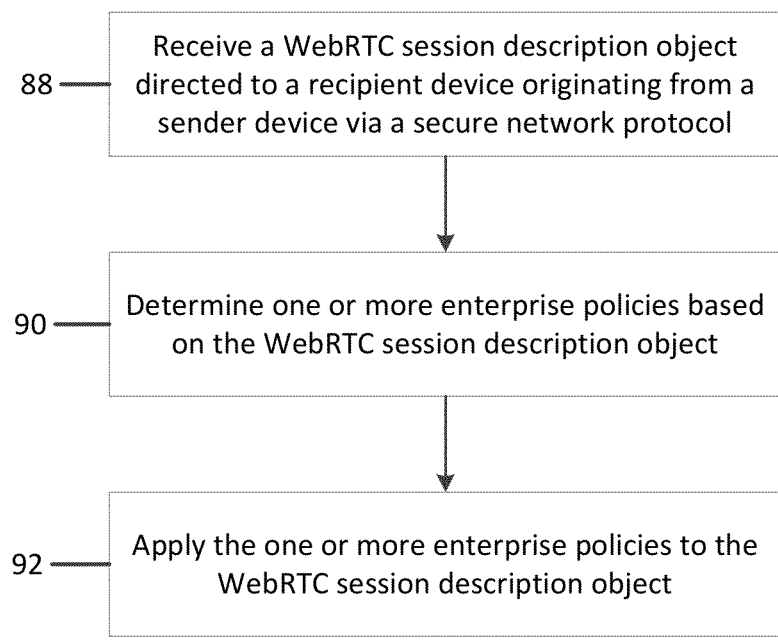
FIG. 3 is a flowchart illustrating exemplary operations for distributed application of enterprise policies to WebRTC interactive sessions.

To generally describe exemplary operations of the distributed policy enforcement agent 12 of FIG. 1 for distributed application of enterprise policies to WebRTC interactive sessions, FIG. 3 is provided. FIG. 3 is a flowchart illustrating exemplary operations for distributed application of enterprise policies to WebRTC interactive sessions. In this example of FIG. 3, operations begin with the distributed policy enforcement agent 12 receiving a WebRTC session description object directed to a recipient device (such as the enterprise user device 28) originating from a sender device (such as the external user device 40) via a secure network connection (block 88). In some embodiments, the WebRTC session description object received by the distributed policy enforcement agent 12 may represent an "offer" from the sender device in a WebRTC offer/answer exchange, or may represent an "answer" sent in response to a previously sent offer.

With continuing reference to FIG. 3, the distributed policy enforcement agent 12 next determines one or more enterprise policies based on the WebRTC session description object (block 90). In some embodiments, the enterprise policies may be determined based on a content of the WebRTC session description object, and/or on data provided by packets transporting the WebRTC session description object. According to some embodiments, the content of the WebRTC session description object and/or data provided by packets transporting the WebRTC session description object may include an identity associated with the sender device, an identity of an intermediary that forwarded the WebRTC session description object to the recipient device, an exchange of encryption keys, or a type of WebRTC interactive flow. Some embodiments may provide that the distributed policy enforcement agent 12 determines the one or more enterprise policies by sending a query for enterprise policies to an enterprise policy data store (not shown), such as the enterprise policy data store 26 of FIG. 1.

With continuing reference to FIG. 3, the distributed policy enforcement agent 12 applies the one or more enterprise policies to the WebRTC session description object (block 92). As non-limiting examples, the distributed policy enforcement agent 12 may apply the enterprise policies by validating the WebRTC session description object format, by establishing or declining a WebRTC interactive session, by providing options for an alternative WebRTC interactive session to the sender device, by modifying the contents of a WebRTC session description object, and/or by causing a WebRTC interactive flow to be redirected, cloned, logged, or recorded.

Figure 4A:
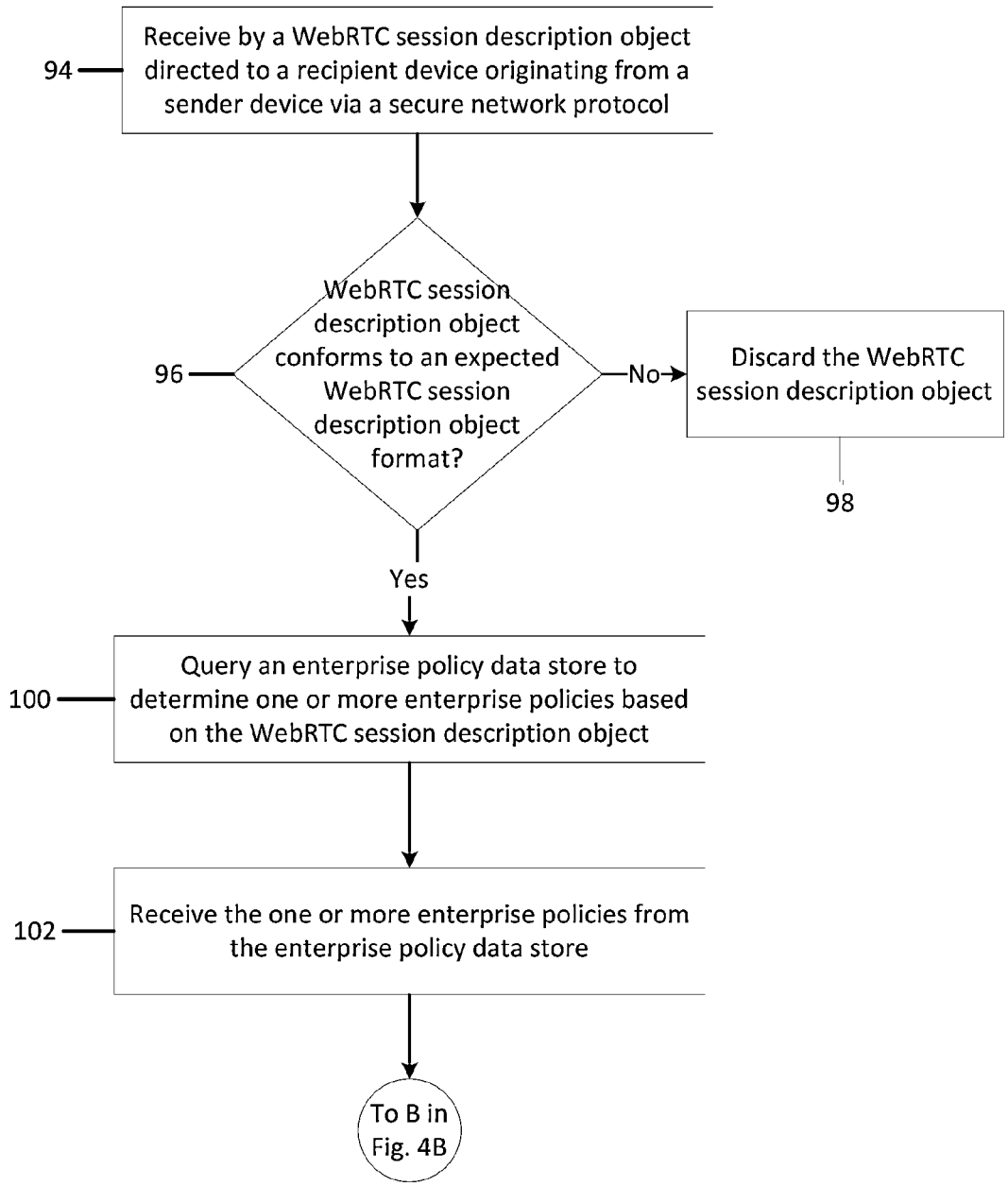
FIGS. 4A and 4B are flowcharts illustrating more detailed exemplary operations for distributed application of enterprise policies to WebRTC session description objects and interactive flows.
Figure 4B:
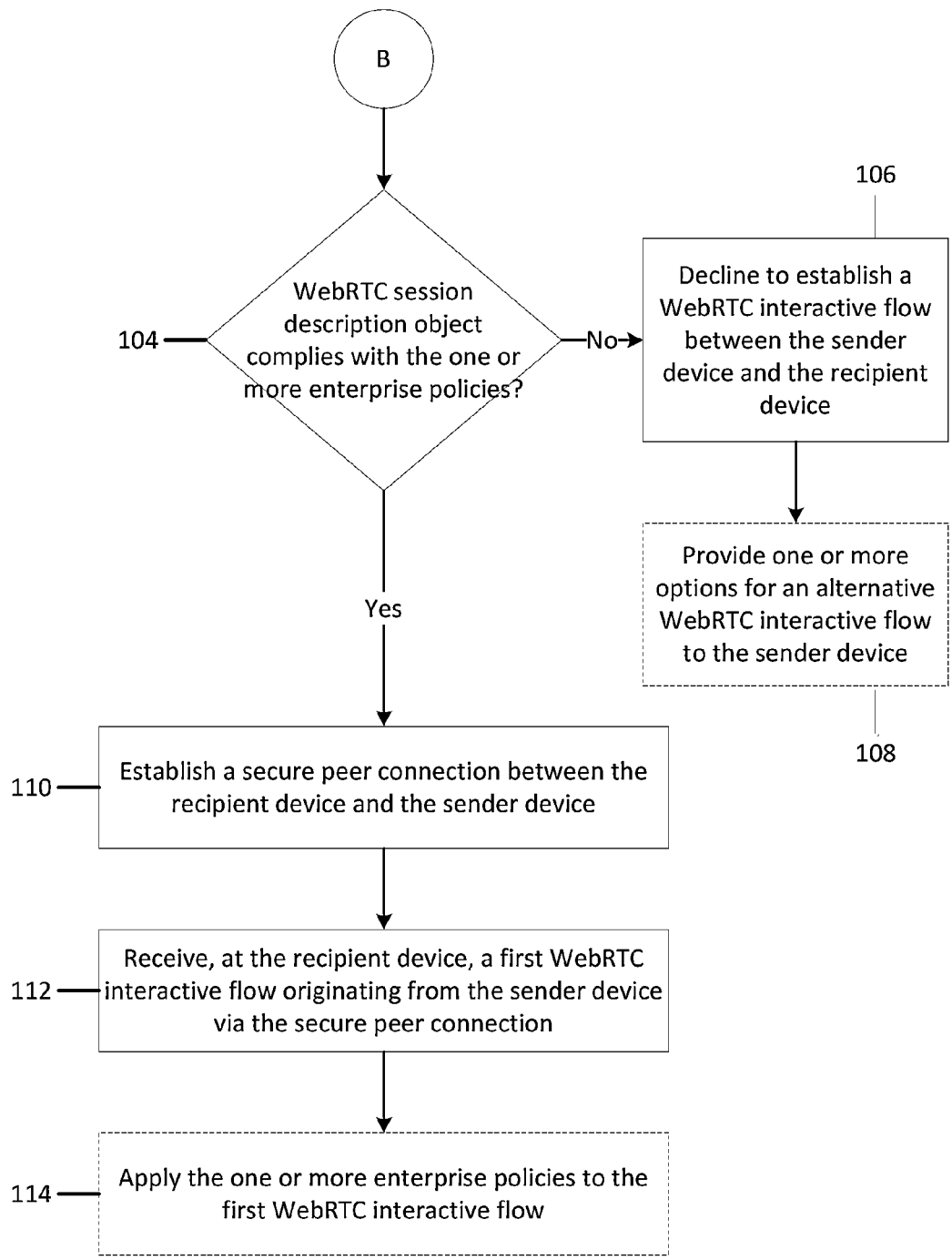

FIGS. 4A and 4B are provided to illustrate in more detail an exemplary generalized process for the distributed policy enforcement agent 12 of FIG. 1 to provide distributed application of enterprise policies to WebRTC interactive sessions. FIG. 4A details operations for receiving and validating a WebRTC offer/answer exchange, and determining appropriate enterprise policies to apply to a WebRTC interactive session. FIG. 4B shows operations for applying the enterprise policies to the WebRTC offer/answer exchange and a resulting WebRTC interactive flow. For illustrative purposes, FIGS. 4A and 4B refer to elements of the exemplary system 10 and the distributed policy enforcement agent 12 of FIG. 1.

Referring now to FIG. 4A, the distributed policy enforcement agent 12 receives a WebRTC session description object directed to a recipient device (such as the enterprise user device 28) originating from a sender device (such as an external user device 40) via a secure network connection (block 94). The WebRTC session description object received by the distributed policy enforcement agent 12 may represent an "offer" from the sender device in a WebRTC offer/answer exchange, or may represent an "answer" sent in response to a previously sent offer. The distributed policy enforcement agent 12 next determines whether the WebRTC session description object conforms to an expected WebRTC session description object format (block 96). If the distributed policy enforcement agent 12 determines that the WebRTC session description object fails to conform to an expected format, the distributed policy enforcement agent 12 may simply discard the WebRTC session description object (block 98). This may provide an extra measure of security against attack by malware and/or viruses seeking access to the enterprise network 14 via a WebRTC interactive session.

If the distributed policy enforcement agent 12 determines at block 96 of FIG. 4A that the WebRTC session description object is in an appropriate format, the distributed policy enforcement agent 12 next determines one or more enterprise policies to enforce. In this example, the distributed policy enforcement agent 12 queries an enterprise policy data store (such as the enterprise policy data store 26 of FIG. 1) to determine one or more enterprise policies based on the WebRTC session description object (block 100). In some embodiments, the enterprise policies may be determined based on a content of the WebRTC session description object, and/or on data provided by packets transporting the WebRTC session description object. The content of the WebRTC session description object and/or the data provided by packets transporting the WebRTC session description object may include as non-limiting examples an identity associated with the sender device, an identity of an intermediary that forwarded the WebRTC session description object to the recipient device, an exchange of encryption keys, or a type of WebRTC interactive flow. In some embodiments, an identity associated with the sender device may include an identity of the sender device, a user ID of the sender, and/or a name of the sender. The distributed policy enforcement agent 12 then receives one or more enterprise policies from the enterprise policy data store (block 102). Processing then continues at block 104 of FIG. 4B.

Referring now to FIG. 4B, the distributed policy enforcement agent 12 evaluates whether the WebRTC session description object complies with the one or more enterprise policies (block 104). As non-limiting examples, the enterprise policies may dictate what WebRTC interactive flow types are permitted, or may expressly allow or deny WebRTC interactive sessions based on an identity associated with the sender device or sender domain or identity. If the WebRTC session description object is determined not to comply with the one or more enterprise policies at block 104, the distributed policy enforcement agent 12 may decline to establish a WebRTC interactive flow between the sender device and the recipient device (block 106). The distributed policy enforcement agent 12 may optionally provide one or more options for an alternative WebRTC interactive flow to the sender device (block 108).

If the distributed policy enforcement agent 12 determines at block 104 that the WebRTC session description object complies with the one or more enterprise policies, the distributed policy enforcement agent 12 permits a secure peer connection to be established between the recipient device and the sender device, as discussed above with respect to FIG. 2 (block 110). In some embodiments, establishing a secure peer connection may include the distributed policy enforcement agent 12 modifying one or more ICE packets used in hole punching based on the one or more enterprise policies. The recipient device then receives a first WebRTC interactive flow originating from the sender device via the secure peer connection, and the WebRTC interactive session commences (block 112).

In some embodiments, the distributed policy enforcement agent 12 may optionally apply the one or more enterprise policies to the first WebRTC interactive flow (block 114). For example, the enterprise policies may require that the first WebRTC interactive flow be recorded, logged, or redirected. Where the first WebRTC interactive flow is an interactive data interchange, applying the one or more enterprise policies may include examining the contents of the interactive data interchange to determine compliance with the one or more enterprise policies.

Figure 5:
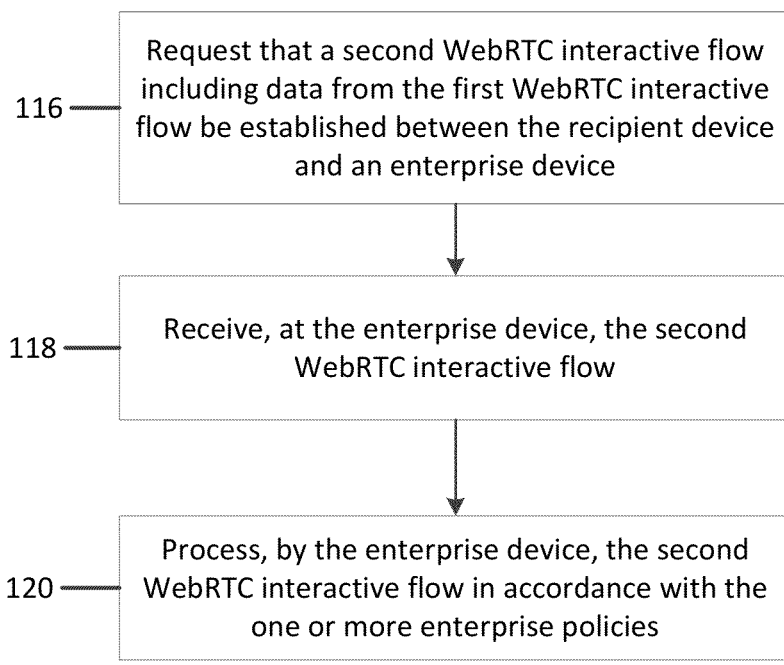
FIG. 5 is a flowchart illustrating exemplary operations for distributed application of enterprise policies to WebRTC interactive flows.

In this regard, FIG. 5 illustrates exemplary operations for applying enterprise policies to a WebRTC interactive flow, as described in block 114 of FIG. 4B. In FIG. 5, operations begin with the distributed policy enforcement agent 12 requesting that a second WebRTC interactive flow including data from the first WebRTC interactive flow be established between the recipient device and an enterprise device, such as the enterprise device 36 of FIG. 1 (block 116). In response to the request, the second WebRTC interactive flow is received at the enterprise device (block 118). The second WebRTC interactive flow is then processed by the enterprise device in accordance with the one or more enterprise policies (block 120). In some examples, the second WebRTC interactive flow may be recorded or logged as required by the enterprise policies, or may be redirected to another device within the enterprise, such as a media anchor device (not shown).

Some embodiments may provide variations of the WebRTC topology described above with respect to FIG. 5. For example, the distributed policy enforcement agent 12 may request that the first WebRTC interactive flow be established directly between an external user device and the enterprise device, and that the second WebRTC interactive flow be received at the recipient device. In some embodiments, the distributed policy enforcement agent 12 may access the contents of the first WebRTC interactive flow, and may apply enterprise policies by directly manipulating, redirecting, logging, or copying the contents of the first WebRTC interactive flow, as non-limiting examples.

Figure 6:
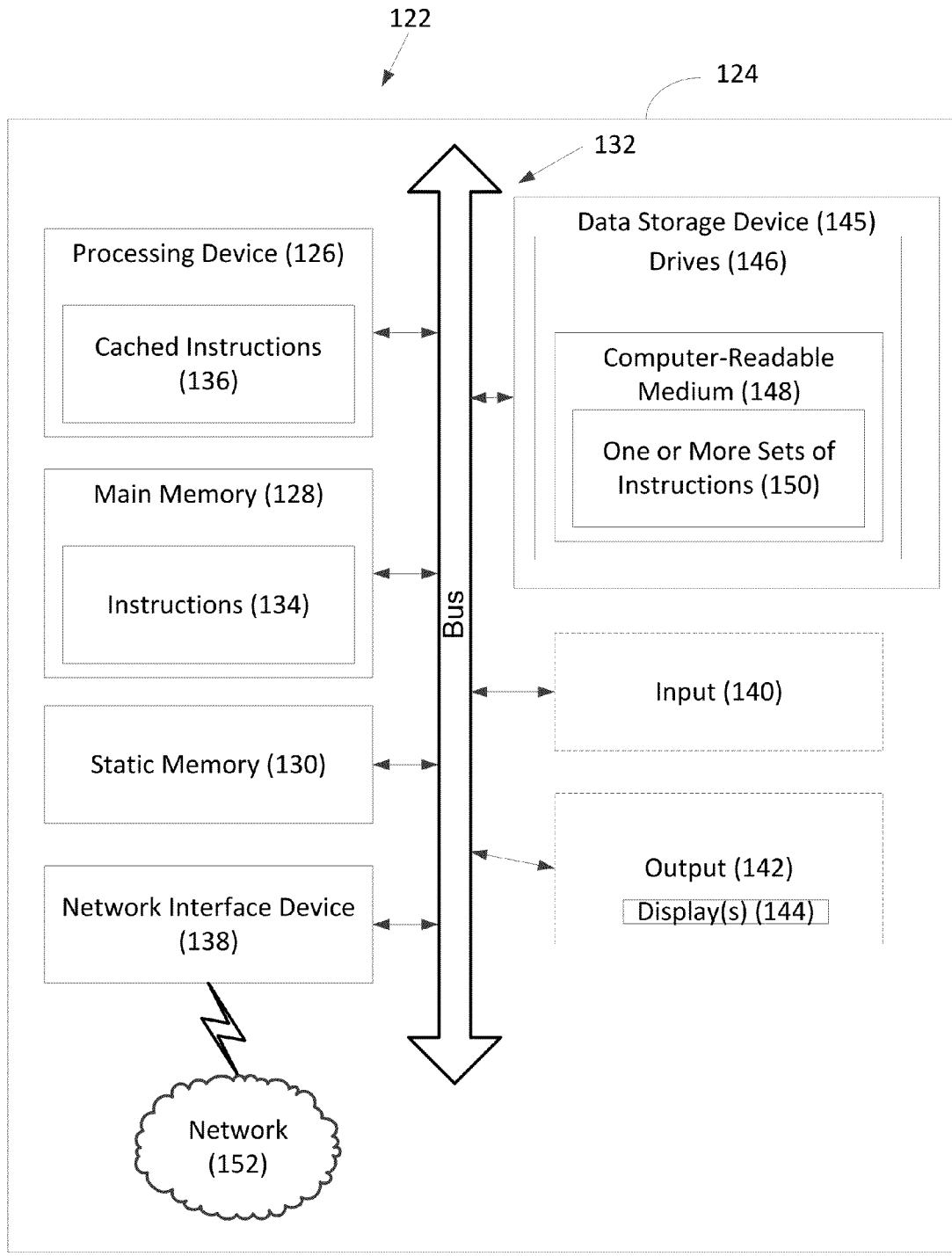
FIG. 6 is a block diagram of an exemplary processor-based system that may include the distributed policy enforcement agent of FIG. 2.

FIG. 6 provides a schematic diagram representation of a processing system 122 in the exemplary form of an exemplary computer system 124 adapted to execute instructions to perform the functions described herein. In some embodiments, the processing system 122 may execute instructions to perform the functions of the distributed policy enforcement agent 12 of FIG. 1. In this regard, the processing system 122 may comprise the computer system 124, within which a set of instructions for causing the processing system 122 to perform any one or more of the methodologies discussed herein may be executed. The processing system 122 may be connected (as a non-limiting example, networked) to other machines in a local area network (LAN), an intranet, an extranet, or the Internet. The processing system 122 may operate in a client-server network environment, or as a peer machine in a peer-to-peer (or distributed) network environment. While only a single processing system 122 is illustrated, the terms "controller" and "server" shall also be taken to include any collection of machines that individually or jointly execute a set (or multiple sets) of instructions to perform any one or more of the methodologies discussed herein. The processing system 122 may be a server, a personal computer, a desktop computer, a laptop computer, a personal digital assistant (PDA), a computing pad, a mobile device, or any other device and may represent, as non-limiting examples, a server or a user's computer.

The exemplary computer system 124 includes a processing device or processor 126, a main memory 128 (as non-limiting examples, read-only memory (ROM), flash memory, dynamic random access memory (DRAM) such as synchronous DRAM (SDRAM), etc.), and a static memory 130 (as non-limiting examples, flash memory, static random access memory (SRAM), etc.), which may communicate with each other via a bus 132. Alternatively, the processing device 126 may be connected to the main memory 128 and/or the static memory 130 directly or via some other connectivity means.

The processing device 126 represents one or more processing devices such as a microprocessor, central processing unit (CPU), or the like. More particularly, the processing device 126 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 126 is configured to execute processing logic in instructions 134 and/or cached instructions 136 for performing the operations and steps discussed herein.

The computer system 124 may further include a communications interface in the form of a network interface device 138. It also may or may not include an input 140 to receive input and selections to be communicated to the computer system 124 when executing the instructions 134, 136. It also may or may not include an output 142, including but not limited to display(s) 144. The display(s) 144 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 124 may or may not include a data storage device 145 that includes using drive(s) 146 to store the functions described herein in a computer-readable medium 148, on which is stored one or more sets of instructions 150 (e.g., software) embodying any one or more of the methodologies or functions described herein. The functions can include the methods and/or other functions of the processing system 122, a participant user device, and/or a licensing server, as non-limiting examples. The one or more sets of instructions 150 may also reside, completely or at least partially, within the main memory 128 and/or within the processing device 126 during execution thereof by the computer system 124. The main memory 128 and the processing device 126 also constitute machine-accessible storage media. The instructions 134, 136, and/or 150 may further be transmitted or received over a network 152 via the network interface device 138. The network 152 may be an intra-network or an inter-network.

While the computer-readable medium 148 is shown in an exemplary embodiment to be a single medium, the term "machine-accessible storage medium" should be taken to include a single medium or multiple media (as non-limiting examples, a centralized or distributed database, and/or associated caches and servers) that store one or more sets of instructions. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A system for applying an enterprise policy to a Web Real-Time Communications (WebRTC) interactive session, comprising:
   at least one communications interface; and a recipient device associated with the at least one communications interface and comprising a distributed policy enforcement agent, the distributed policy enforcement agent configured to:
receive a WebRTC session description object directed to the recipient device originating from a sender device;
determine one or more enterprise policies based on the WebRTC session description object;
determine whether the WebRTC session description object complies with the one or more enterprise policies; and
responsive to determining that the WebRTC session description object complies with the one or more enterprise policies:
establish a secure peer connection between the recipient device and the sender device;
receive, at the recipient device, a first WebRTC interactive flow originating from the sender device via the secure peer connection;
request, by the distributed policy enforcement agent, that a second WebRTC interactive flow including data from the first WebRTC interactive flow be established between the recipient device and an enterprise device;
receive, at the enterprise device, the second WebRTC interactive flow; and
process, by the enterprise device, the second WebRTC interactive flow in accordance with the one or more enterprise policies.

2. A method for applying an enterprise policy to a Web Real-Time Communications (WebRTC) interactive session, comprising:
receiving, by a distributed policy enforcement agent of a recipient device, a WebRTC session description object directed to the recipient device originating from a sender device;
determining, by the distributed policy enforcement agent, one or more enterprise policies based on the WebRTC session description object;
applying the one or more enterprise policies to the WebRTC session description object;
determining, by the distributed policy enforcement agent, whether the WebRTC session description object conforms to an expected WebRTC session description object format; and
responsive to determining that the WebRTC session description object does not conform to the expected WebRTC session description object format, discarding the WebRTC session description object.

3. The method of claim 2, wherein receiving the WebRTC session description object comprises receiving the WebRTC session description object via a secure network connection.

4. The method of claim 2, wherein determining the one or more enterprise policies comprises:
querying an enterprise policy data store by the distributed policy enforcement agent; and
responsive to the querying, receiving by the distributed policy enforcement agent, the one or more enterprise policies from the enterprise policy data store.

5. The method of claim 2, wherein determining the one or more enterprise policies based on the WebRTC session description object comprises determining the one or more enterprise policies based on an identity associated with the sender device, an identity of an intermediary that forwarded the WebRTC session description object to the recipient device, an exchange of encryption keys, or a type of WebRTC interactive flow, or combinations thereof.

6. The method of claim 2, wherein applying the one or more enterprise policies to the WebRTC session description object comprises determining whether the WebRTC session description object complies with the one or more enterprise policies.

7. The method of claim 6, further comprising, responsive to determining that the WebRTC session description object complies with the one or more enterprise policies, establishing a first WebRTC interactive flow between the sender device and the recipient device.

8. The method of claim 7, wherein establishing the first WebRTC interactive flow comprises:
establishing a secure peer connection between the recipient device and the sender device;
receiving, at the recipient device, the first WebRTC interactive flow originating from the sender device via the secure peer connection; and
applying the one or more enterprise policies to the first WebRTC interactive flow.

9. The method of claim 8, wherein establishing the secure peer connection comprises modifying one or more Interactive Connectivity Establishment (ICE) packets based on the one or more enterprise policies.

10. The method of claim 8, wherein the first WebRTC interactive flow is an interactive data interchange; and
wherein applying the one or more enterprise policies to the first WebRTC interactive flow comprises examining the contents of the interactive data interchange to determine compliance with the one or more enterprise policies.

11. A system for applying an enterprise policy to a Web Real-Time Communications (WebRTC) interactive session, comprising:
at least one communications interface; and
a recipient device associated with the at least one communications interface and comprising a distributed policy enforcement agent, the distributed policy enforcement agent configured to:
receive a WebRTC session description object directed to the recipient device originating from a sender device;
determine one or more enterprise policies based on the WebRTC session description object;
determine whether the WebRTC session description object complies with the one or more enterprise policies; and
responsive to determining that the WebRTC session description object does not comply with the one or more enterprise policies, decline to establish a WebRTC interactive flow between the sender device and the recipient device.

12. A system for applying an enterprise policy to a Web Real-Time Communications (WebRTC) interactive session, comprising:
at least one communications interface; and
a recipient device associated with the at least one communications interface and comprising a distributed policy enforcement agent, the distributed policy enforcement agent configured to:
receive a WebRTC session description object directed to the recipient device originating from a sender device;
determine one or more enterprise policies based on the WebRTC session description object;
determine whether the WebRTC session description object complies with the one or more enterprise policies; and
responsive to determining that the WebRTC session description object does not comply with the one or more enterprise policies, provide one or more options for an alternative WebRTC interactive flow to the sender device.

13. A non-transitory computer-readable medium having stored thereon computer-executable instructions to cause a processor to implement a method, comprising:
- receiving, by a distributed policy enforcement agent of a recipient device, a Web Real-Time Communications (WebRTC) session description object directed to the recipient device originating from a sender device via a secure network connection;
- determining, by the distributed policy enforcement agent, one or more enterprise policies based on the WebRTC session description object;
- determining whether the WebRTC session description object complies with the one or more enterprise policies; and
- responsive to determining that the WebRTC session description object complies with the one or more enterprise policies:
  - establishing a secure peer connection between the recipient device and the sender device;
  - receiving, at the recipient device, a first WebRTC interactive flow originating from the sender device via the secure peer connection;
  - requesting, by the distributed policy enforcement agent, that a second WebRTC interactive flow including data from the first WebRTC interactive flow be established between the recipient device and an enterprise device;
  - receiving, at the enterprise device, the second WebRTC interactive flow; and
  - processing, by the enterprise device, the second WebRTC interactive flow in accordance with the one or more enterprise policies.

14. A non-transitory computer-readable medium having stored thereon computer-executable instructions to cause a processor to implement a method, comprising:
- receiving, by a distributed policy enforcement agent of a recipient device, a Web Real-Time Communications (WebRTC) session description object directed to the recipient device originating from a sender device via a secure network connection;
- determining, by the distributed policy enforcement agent, one or more enterprise policies based on the WebRTC session description object;
- determining whether the WebRTC session description object complies with the one or more enterprise policies; and
- responsive to determining that the WebRTC session description object does not comply with the one or more enterprise policies, declining to establish a WebRTC interactive flow between the sender device and the recipient device.

15. A system for applying an enterprise policy to a Web Real-Time Communications (WebRTC) interactive session, comprising:
- at least one communications interface; and
- a recipient device associated with the at least one communications interface and comprising a distributed policy enforcement agent, the distributed policy enforcement agent configured to:
- receive a WebRTC session description object directed to the recipient device originating from a sender device;
- determine one or more enterprise policies based on the WebRTC session description object;
- apply the one or more enterprise policies to the WebRTC session description object;
- determine whether the WebRTC session description object conforms to an expected WebRTC session description object format; and
- responsive to determining that the WebRTC session description object does not conform to the expected WebRTC session description object format, discard the WebRTC session description object.

16. The system of claim 15, wherein the distributed policy enforcement agent is configured to determine the one or more enterprise policies by:
- querying an enterprise policy data store; and
- responsive to the querying, receiving the one or more enterprise policies from the enterprise policy data store.

17. The system of claim 15, wherein the distributed policy enforcement agent is configured to apply the one or more enterprise policies to the WebRTC session description object by determining whether the WebRTC session description object complies with the one or more enterprise policies.

18. The system of claim 17, wherein the distributed policy enforcement agent is further configured to, responsive to determining that the WebRTC session description object complies with the one or more enterprise policies, establish a first WebRTC interactive flow between the sender device and the recipient device.

19. The system of claim 18, wherein the distributed policy enforcement agent is configured to establish the first WebRTC interactive flow by:
- establishing a secure peer connection between the recipient device and the sender device;
- receiving, at the recipient device, the first WebRTC interactive flow originating from the sender device via the secure peer connection; and
- applying the one or more enterprise policies to the first WebRTC interactive flow.

20. A non-transitory computer-readable medium having stored thereon computer-executable instructions to cause a processor to implement a method, comprising:
- receiving, by a distributed policy enforcement agent of a recipient device, a Web Real-Time Communications (WebRTC) session description object directed to the recipient device originating from a sender device via a secure network connection;
- determining, by the distributed policy enforcement agent, one or more enterprise policies based on the WebRTC session description object;
- determining whether the WebRTC session description object complies with the one or more enterprise policies; and
- responsive to determining that the WebRTC session description object does not comply with the one or more enterprise policies, providing one or more options for an alternative WebRTC interactive flow to the sender device.

21. A non-transitory computer-readable medium having stored thereon computer-executable instructions to cause a processor to implement a method, comprising:
- receiving, by a distributed policy enforcement agent of a recipient device, a Web Real-Time Communications (WebRTC) session description object directed to the recipient device originating from a sender device via a secure network connection;
- determining, by the distributed policy enforcement agent, one or more enterprise policies based on the WebRTC session description object;
- applying the one or more enterprise policies to the WebRTC session description object;
- determining whether the WebRTC session description object conforms to an expected WebRTC session description object format; and responsive to determining that the WebRTC session description object does not conform to the expected WebRTC session description object format, discarding the WebRTC session description object.

22. The non-transitory computer-readable medium of claim 21 having stored thereon the computer-executable instructions to cause the processor to implement the method, wherein determining the one or more enterprise policies comprises:
   querying an enterprise policy data store by the distributed policy enforcement agent; and
   responsive to the querying, receiving by the distributed policy enforcement agent, the one or more enterprise policies from the enterprise policy data store.

23. The non-transitory computer-readable medium of claim 21 having stored thereon the computer-executable instructions to cause the processor to implement the method, wherein applying the one or more enterprise policies to the WebRTC session description object comprises determining whether the WebRTC session description object complies with the one or more enterprise policies.

24. The non-transitory computer-readable medium of claim 23 having stored thereon the computer-executable instructions to cause the processor to implement the method further comprising, responsive to determining that the WebRTC session description object complies with the one or more enterprise policies, establishing a first WebRTC interactive flow between the sender device and the recipient device.

25. The non-transitory computer-readable medium of claim 24 having stored thereon the computer-executable instructions to cause the processor to implement the method, wherein establishing the first WebRTC interactive flow comprises:
   establishing a secure peer connection between the recipient device and the sender device;
   receiving, at the recipient device, the first WebRTC interactive flow originating from the sender device via the secure peer connection; and
   applying the one or more enterprise policies to the first WebRTC interactive flow.

26. A method for applying an enterprise policy to a Web Real-Time Communications (WebRTC) interactive session, comprising:
   receiving, by a distributed policy enforcement agent of a recipient device, a WebRTC session description object directed to the recipient device originating from a sender device;
   determining, by the distributed policy enforcement agent, one or more enterprise policies based on the WebRTC session description object;
   determining whether the WebRTC session description object complies with the one or more enterprise policies; and
   responsive to determining that the WebRTC session description object complies with the one or more enterprise policies:
      establishing a secure peer connection between the recipient device and the sender device;
      receiving, at the recipient device, a first WebRTC interactive flow originating from the sender device via the secure peer connection;
      requesting, by the distributed policy enforcement agent, that a second WebRTC interactive flow including data from the first WebRTC interactive flow be established between the recipient device and an enterprise device;
      receiving, at the enterprise device, the second WebRTC interactive flow; and
      processing, by the enterprise device, the second WebRTC interactive flow in accordance with the one or more enterprise policies.

27. A method for applying an enterprise policy to a Web Real-Time Communications (WebRTC) interactive session, comprising:
   receiving, by a distributed policy enforcement agent of a recipient device, a WebRTC session description object directed to the recipient device originating from a sender device;
   determining, by the distributed policy enforcement agent, one or more enterprise policies based on the WebRTC session description object;
   determining whether the WebRTC session description object complies with the one or more enterprise policies; and
   responsive to determining that the WebRTC session description object does not comply with the one or more enterprise policies, declining to establish a WebRTC interactive flow between the sender device and the recipient device.

28. A method for applying an enterprise policy to a Web Real-Time Communications (WebRTC) interactive session, comprising:
   receiving, by a distributed policy enforcement agent of a recipient device, a WebRTC session description object directed to the recipient device originating from a sender device;
   determining, by the distributed policy enforcement agent, one or more enterprise policies based on the WebRTC session description object;
   determining whether the WebRTC session description object complies with the one or more enterprise policies; and
   responsive to determining that the WebRTC session description object does not comply with the one or more enterprise policies, providing one or more options for an alternative WebRTC interactive flow to the sender device.

* * * * *